United States Patent [19]

Brown

[11] Patent Number: 4,673,507

[45] Date of Patent: Jun. 16, 1987

[54] FLUID TREATMENT PROCESS AND APPARATUS

[75] Inventor: Craig J. Brown, Pickering, Canada

[73] Assignee: Eco-Tec Limited, Pickering, Canada

[21] Appl. No.: 737,123

[22] Filed: May 23, 1985

[51] Int. Cl.⁴ .............................................. C02F 1/42
[52] U.S. Cl. ................................... 210/681; 210/289
[58] Field of Search ............... 210/660, 681, 807, 263, 210/282, 289, 291, 350–353, 484

[56] References Cited

U.S. PATENT DOCUMENTS

| 3,342,340 | 9/1967 | Shindell | 210/282 |
| 3,517,816 | 6/1970 | Hoppen | 210/282 |
| 4,352,735 | 10/1982 | Turetsky | 210/282 |
| 4,366,060 | 12/1982 | Leiser et al. | |

FOREIGN PATENT DOCUMENTS 1463366 2/1977 United Kingdom .

Primary Examiner—Ivars Cintins
Attorney, Agent, or Firm—Rogers, Bereskin & Parr

[57] ABSTRACT

An apparatus and process for treating a fluid by passing the fluid through a bed of particulate material such as an ion exchange resin capable of taking up from the fluid a component to be removed therefrom. Substantially uniform fluid flow distribution across the cross-sectional area of the bed is achieved by employing resins of fine particle size which are maintained in an overpacked condition.

18 Claims, 11 Drawing Figures

FLUID TREATMENT PROCESS AND APPARATUS

FIELD OF THE INVENTION

This invention relates generally to a process for treating a fluid to remove a component therefrom, in which the fluid is passed through a bed of particulate material (usually called "particulate media") capable of taking up the component from the fluid.

BACKGROUND OF THE INVENTION

Processes of this general type are well-known. Typically, the particulate media is a resin which takes up one of more components from the fluid by ion exchange. Ion exchange processes are used for softening water by passing the water through a bed of cation exchange resin particles selected to remove scaling components such as calcium and magnesium. The resin bed is periodically regenerated by passing a suitable regenerant solution through the bed.

Processes of the general type referred to above also have application in the purification or extraction of chemicals from liquids. Gasses may also be treated by this type of process.

DESCRIPTION OF THE PRIOR ART

U.S. Pat. Nos. 3,385,788 and 3,386,914 both issued to Robert F. Hunter disclose examples of prior art processes of the type referred to. In both cases, the process is an ion exchange process performed using a bed of ion exchange resin.

A typical apparatus for use in performing prior art processes of the type referred to (including those disclosed in the Hunter patents) is known as an ion exchange column and comprising a cylindrical pressure vessel arranged in vertical orientation. The resin normally reposes in an unconfined bed in a lower region of the vessel and the liquid is introduced into the top of the vessel and passes downwardly through the resin bed for treatment. A freeboard space is allowed above the resin bed and is typically equal to about 50% of the resin volume. This space allows for swelling of the resin and permits the resin bed to be expanded and fluidized during backwashing for cleaning the resin.

A liquid inlet distributor is provided in the vessel above the resin bed and is arranged to disperse the influent liquid over the top of the resin bed. The distributor also acts as a collector during backwashing and can be connected to waste for disposal of dirty backwash water. The inlet distributor is arranged to prevent disturbance of the top of the resin bed as liquid enters the vessel by avoiding direct impingement of the liquid stream on the top of the resin bed. Such disturbance could result in gouging out of cavities in the resin bed so that the top of the bed would no longer have a flat level surface. Cavities in the resin bed have been found to result in short service runs and poor effluent quality.

As discussed in the Hunter patents, normal practice is to periodically regenerate the resin bed by introducing a regenerant. For this purpose, a regenerant distributor is normally provided below the liquid inlet distributor but above the top of the resin bed. This locatin avoids dilution of the regenerant by the water in the freeboard space and reduces the displacement water volume required. Often, the regenerant distributor takes the form of a pipe system having orifices through which regenerant can be dispersed over the resin bed.

Liquid is normally removed from the lower region of the vessel through an underdrain system at the bottom of the resin bed which communicates with a service outlet/backwash inlet at the bottom of the vessel.

Prior art apparatus of this type suffer from a number of disadvantages. One is that the cost and complexity of the liquid distribution system are considerable. The system must be constructed of corrosion-resistant materials and must be structurally strong to withstand the force of the resin and the hydraulic pressure within the vessel. Maldistribution of liquid flowing through resin bed is also a problem due to resin packing irregularities. This is normally minimized by frequent backwashing of the resin bed which tends to break up any lumps of agglomerated resin and reclassifies and repacks the resin. Poor flow distribution causes some of the liquid being processed to short circuit a portion of the resin bed so that it is purified to a lesser degree.

Flow maldistribution can also occur because of the fact that ion exchange resins tend to swell and shrink in volume as they change ionic form and as the concentration of the liquid in contact with resin changes. For example, a strong base anion resin changes volume by a factor of 15% in changing from the chloride form to the hydroxyl form. Shrinking of the resin at this time promotes packing irregularities and causes flow maldistribution. This effect was reported by Byrne and Lapidus as long ago as 1955 (J. Am Chem. Soc. Vol. 77 p. 6506, 1955).

In order to minimize the effects of localized packing of the resin or variations in resin levels, normal practice is to maintain the height of the resin bed above a determined minimum; 30" (inches) is commonly accepted as a minimum height. However, it is also recognized that only a small fraction of the total resin bed is exchanging ions at any given time. That part of the resin bed (called the "exchange zone") is frequently much less than the 30" minimum bed height. However, reduction of the bed height (and consequent saving in cost) has generally been thought to be impossible because it could only be achieved at the expense of uneven flow distribution. Of course, uneven flow distribution would lead to inefficiency in the performance of the process.

An object of the present invention is to provide an apparatus and process of the type referred to which address these problems of the prior art. A specific aim is to achieve even flow distribution across the cross-sectional area of the resin bed for beds having a depth approaching or even less than the commonly accepted 30" minimum bed depth.

SUMMARY OF THE INVENTION

In one aspect, the invention provides an apparatus for treating a fluid to remove a component therefrom in which the fluid is passed through a bed of particulate material capable of taking up the component from the fluid. The apparatus includes a vessel containing the bed, the vessel having first and second ports for permitting flow of fluid through the bed, and means for confining the resin bed within the vessel so that the bed defines respective first and second end faces, a substantially constant bed depth between said faces, and a cross-sectional area which is constant or increases uniformly from one face to the other. The confining means includes headers at the respective bed end faces, each header including fluid flow passageways providing communication between the bed and the relevant one of the ports. The passageways are arranged to distribute fluid flowing from the port into the bed substantially evenly over the cross-sectional area of the bed at the said face. The particulate material forming the bed is of substantially uniform particule size and is fully confined by the confining means in an overpacked condition. The size of the particles and the degree of overpacking are selected to provide for substantially even distribution of fluid across the crosssectional area of the bed in flowing between the end faces of the bed.

The process provided by the invention involves passing the fluid through a bed of particlate material capable of taking up from the fluid the component to be removed therefrom, in which the be comprises particles of substantially uniform size maintained in an overpacked condition between first and second end faces of the bed. The bed defines a substantially constant bed depth between the faces and a cross-sectional area which is constant or increases uniformly from one face to the other. The fluid is passed through the bed by distributing the fluid substantially uniformly across one of the end faces, permitting the fluid to flow through the bed, and collecting the fluid substantially uniformily across the other said end face of the bed. The size of the particules and the degree of overpacking of the bed are selected to provide for substantially even distribution of fluid across the cross-sectional area of the bed in flowing between the said bed end faces.

The terms "overpacking" as used in the context of the present invention are intended to mean that the particles are confined within the resin bed so that they are subjected to compression at all times. In the case of an ion exchange resin bed, this would include those times when the resin particles have shrunk due to changes in ionic form.

It has been found that the disadvantages of the prior art enumerated above can be avoided or reduced by means of the apparatus and process of the invention. Practical experiments have shown that very uniform flow can be achieved through ion exchange resin beds less than the customary 30" minimum depth. In addition, significant cost advantages can be obtained as compared with conventional apparatus. A still further advantage is that it has been found possible to orient the vessel other than in the customary vertical disposition of the prior art, which can offer other practical advantages.

Preferably, the particulate material employed in the apparatus and process of the invention is of relatively fine mesh size as compared with typical conventional resin sizes. For example, ion exchange resins normally employed in most industrial and commercial processes have particle size nominally in the 16–40 U.S. mesh range with an effective size of typically 0.5 mm. In comparison, particle sizes of finer than 40 mesh size and preferably in the 80–120 mesh size range with an effective size of typically 0.12 mm have been found to be preferred in the invention. These particle sizes offer superior ion exchange kinetics and are much stronger mechanically and less prone to attrition due to swelling and shrinking.

BRIEF DESCRIPTION OF THE DRAWINGS

In order that the invention may be more clearly understood, reference will now be made to the accompanying drawings which illustrate a number of preferred embodiments of the invention by way of example, and in which.

DESCRIPTION OF PRIOR ART APPARATUS

Figure 1:
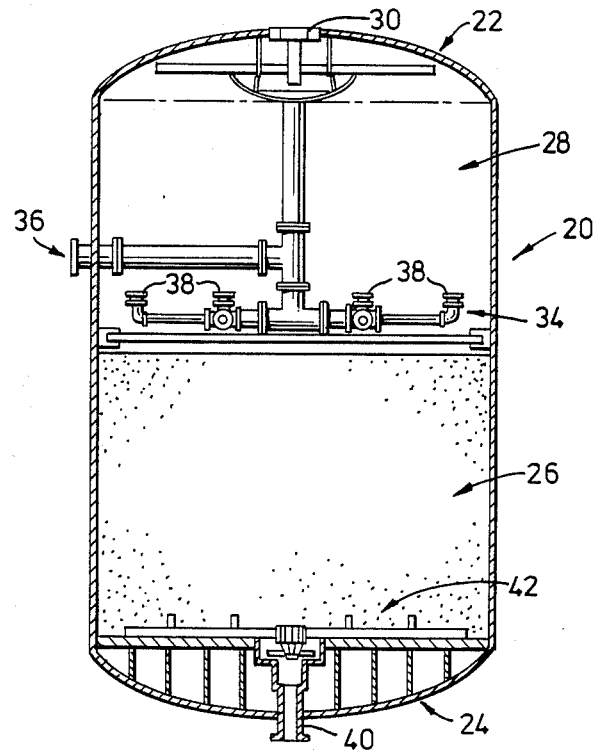
FIG. 1 is a vertical sectional view through a prior art ion exchange column.

Referring first to FIG. 1, a prior art ion exchange column is shown to comprise a cylindrical pressure vessel or shell 20 which is arranged in vertical orientation and which has curved head 22 and 24. A resin bed freely supported within the shell is shown at 26. As discussed previously, the resin is added to the vessel so that a freeboard 28 remains above the resin bed and is equal to about 50% of the resin volume. For a typical 30" high resin bed this would represent 1.25 cubic feet of liquid holdup per square foot of bed cross-sectional area in addition to the resin interstitial volume. In the prior art, this freeboard space is necessary to allow for swelling of the resin and for permitting the resin bed to be expanded and fluidized during backwash but the liquid holdup volume represents a disadvantage in that the liquid occupying this volume obviously is not available for reaction with the resin.

A service inlet 30 is provided at the top of the vessel 20 for receiving influent liquid and communicates with a distributor 32 arranged to distribute the liquid without disturbing the top of the resin bed as discussed previously. The inlet distributor 32 acts as a collector during backwashing.

Below the inlet distributor but above the top of the resin bed (typically about 6" above the resin bed) is a system of pipes denoted 34 which form a regenerant distributor communicating with a regenerant inlet 36. Nozzles 38 are provided in the pipe system 34 for delivery of regenerant to the resin bed.

A service outlet/backwash inlet 40 at the bottom of vessel 20 communicates with an underdrain system 42 at the bottom of the resin bed for permitting delivery of liquid from the vessel during normal operation. The underdrain system also acts to delivery backwash liquid to the resin bed at appropriate times. When subfills are used in the vessel, the underdrain may comprise a hub located in the center of the lower head 24 of the vessel directly over the outlet/inlet 40, and orificed curved lateral members radiating from the hub. When subfills are omitted, the underdrain may be formed by a pipe system having orifices smaller than the resin particles and located over a reinforced flat lower head on the vessel, as shown.

DESCRIPTION OF THE PREFERRED EMBODIMENT

Figure 2:
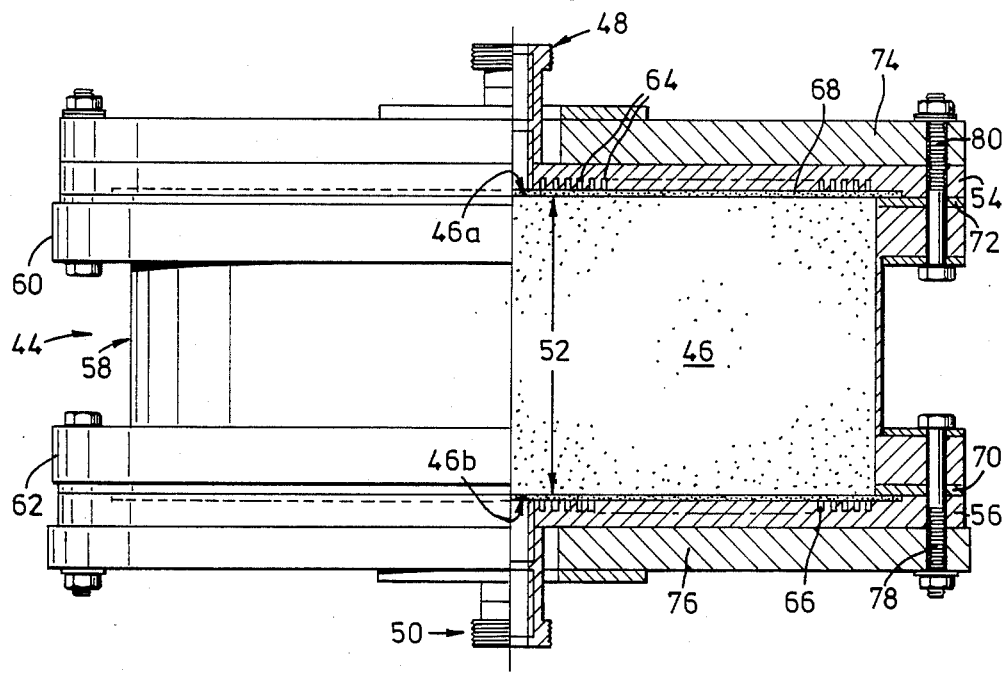
FIG. 2 is a view similar to FIG. 1 through an apparatus of the form provided by the invention.

Referring now to FIG. 2, an apparatus of the form provided by the invention includes a vessel generally denoted 44 which contains the resin bed 46. The vessel includes first and second ports 48 and 50 for permitting flow of fluid through the bed. The bed is confined within the vessel so as to present to the liquid flow respective first and second end faces 46a and 46b, a substantially consistant bed depth 52 between the faces and a crosssectional area which in this embodiment is of constant circular shape but which could increase uniformly from one face to the other. The bed is confined by headers 54 and 56 at the respective bed end faces 46a and 46b. Each header includes a complex array of fluid flow passageways (best shown in FIG. 3) providing communication between the bed and the relevant one of the ports 48, 50. As will be described, the passageways are arranged to distribute fluid flowing from the relevant port into the bed, substantially evenly over the cross-sectional area of the bed at the relevant face 46a or 46b. The particulate material forming the bed is of substantially uniform particle size and is fully confined by the headers 54, 56 in an overpacked condition. The size of the particles and the degree of overpacking is selected to provide for substantially even distribution of fluid across the cross-sectional area of the bed in flowing between the bed end faces 46a and 46b.

Referring now to FIG. 2 in more detail, the vessel 44 simply comprises a short length of pipe 58 fitted which flanges 60, 62 at its ends. The pipe and flanges form which is sometimes termed the "shell" of the vessel in which the resin bed is confined.

Each of the headers 54, 56 comprises a circular plate of the same diameter as each of the flanges 60, 62 in which are formed the fluid flow passageways discussed above. In FIG. 2, some of those passageways are individually denoted by reference numeral 64. The passageways open into the inner face of the header plate (that is the face adjacent the bed) and a screen having openings smaller than the expected minimum particules size of the resin in bed 46 is provided between the relevant header plate and the bed itself to prevent loss of the resin particles into the fluid flow passageways in the plate. In FIG. 2, the two screens are denoted 66 and 68. Each screen may consist of one or more layers of permeable cloth or other filtration medium. The screen must be sufficiently strong to retain the resin under a considerable force as discussed below although it is effectively reinforced by the header plate. The screen is clamped between the outer surface of the relevant flange of the shell and a sealing surface at the inner surface of the header plate and is sealed with elastomeric gaskets at both ends of the shell. The gaskets are indicated at 70 and 72 in FIG. 2.

Each header plate and the associated screen is held in place by a backing plate which is clamped around its periphery to the adjacent flange of the shell of the vessel. The two backing plates are denoted respectively 74 and 76 in FIG. 2 and some of the clamp bolts are indicated at 78 and 80. Each of the ports 48, 50 comprises a tubular member which is carried by the relevant one of the header plates 54, 56 and which extends outwardly through an opening in the associated backing plate 74, 76, as best seen in FIG. 3.

Figure 3B:
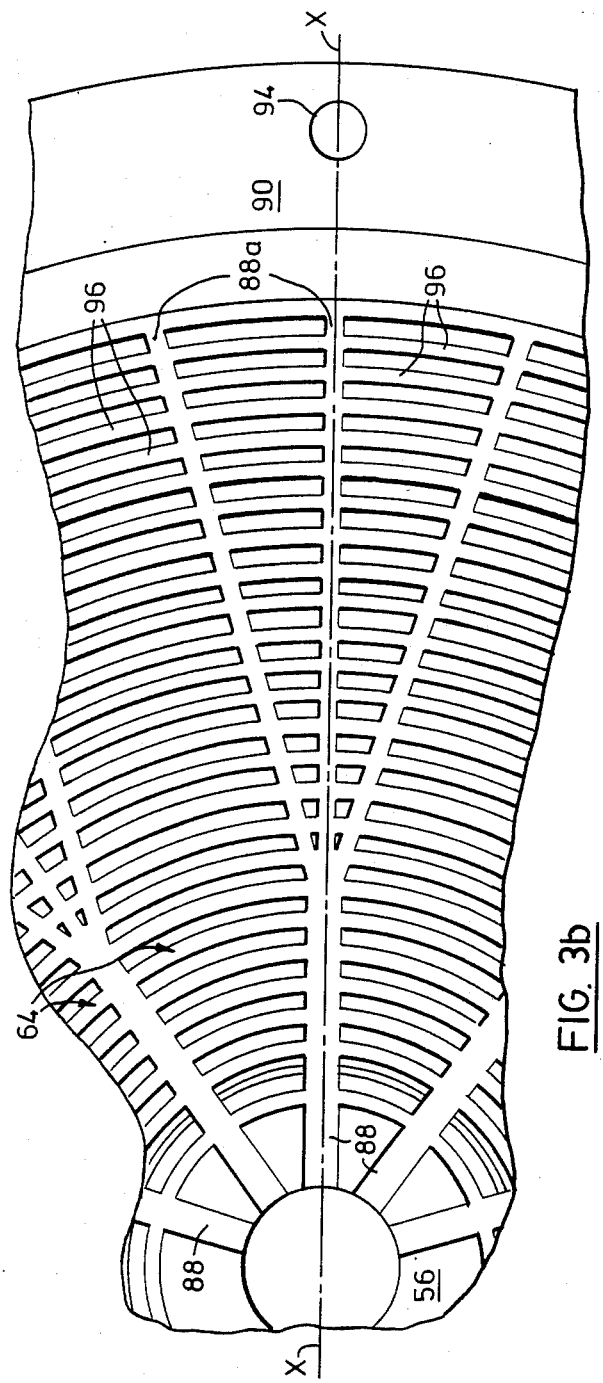
FIG. 3 comprises two views denoted (a) and (b) which are respectively a vertical sectional view and an elevational view of one of the header plates of the apparatus shown in FIG. 2.
Figure 3A:
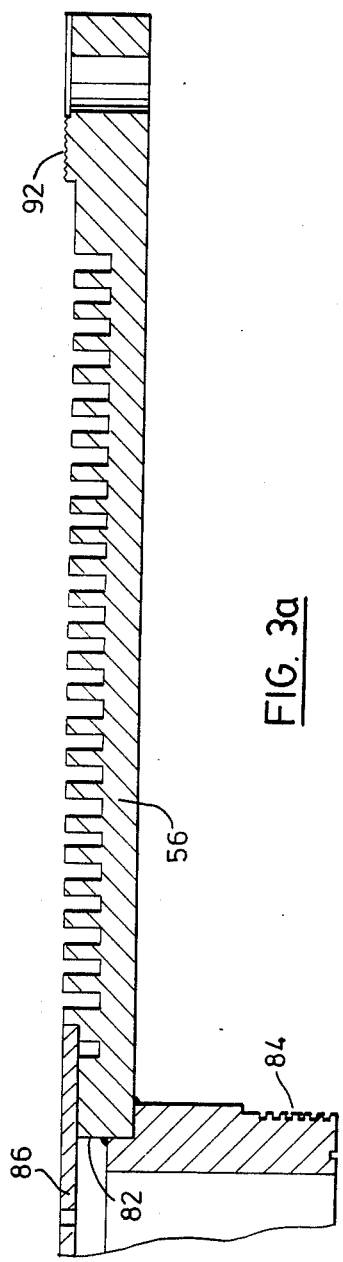

Referring now to that view, FIG. 3 comprises two views denoted 3a and 3b of which FIG. 3(a) is an enlarged sectional view on a radius of a typical one of the header plates shown in FIG. 2; in this case, FIG. 3(a) may in fact be considered to be an enlarged view of the part of header plate 56 which is seen to the right of the centre line in FIG. 2. FIG. 3(b) is a partial plan view corresponding to FIG. 3(a) showing the layout of the fluid flow passageways in the header plate.

Referring first to FIG. 3(a), the header plate itself is denoted 56 and extends about a center line denoted X—X, about which the plate is symmetrical. Plate 56 is provided with a circular central opening 82 on center line X—X into which is inserted a tubular member 84 forming port 50 of FIG. 2. A circular baffle plate 86 closes opening 82 at the inner face of the header plate to dissipate some of the energy contained in the liquid as it enters the resin bed and prevent "jetting" of the liquid down the center of the bed. In this particular embodiment, header plate 56, member 84 and the baffle plate 86 are made of polypropylene and are welded together by conventional polypropylene welding techniques.

FIG. 3(b) shows part of the header plate without baffle plate 86 in place. Flow channels 88 extend radially outwardly from opening 82 to a sealing surface 90 around the perimeter of the inside surface of the header plate. As best seen in FIG. 3(a) serrations 92 are provided on surface 90 for sealing with the gasket 70 in the assembled vessel. Gasket 70 is received in a recess (not shown) in the relevant flange of the vessel shell. In each of FIGS. 3(a) and (b) one of a series of openings through the header plate for receiving the clamp bolts 78 is shown at 74. The openings are equally distributed around the perimeter of the header plate for providing a substantially uniform clamping force in use.

In the particular embodiment illustrated, each of the radial fluid flow passageways 88 branches into three smaller passageways 88a, one of which continues radially while the other two diverge from the radial passageway. Additional passageways 96 then extend arcuately about the center line X—X between the radial passageways.

This fluid flow passageway arrangement allows liquid to be collected or distributed over the entire cross-sectional area of the resin bed and directed along the radial passageways towards the relevant port 50, or vice versa. The exact configuration of the passageways is not believed to be critical except that the distance between the inner faces of the two header plates should be equal over the entire cross-sectional area of the bed in the assembled apparatus. The passageways should be designed to allow the required flow rate without excessive pressure drop but should be sufficiently small to minimize liquid hold-up, which causes undesirable dilution of the process solution. Liquid hold-up volume in the passageway should be less than 0.04 cubic feet per square foot of bed cross-sectional area and preferably less than 0.03 cubic feet per square foot for each of the two header plates.

The header plates 54, 56 can be fabricated from steel and suitably lined for corrosion resistance or fabricated from plastic and reinforced with steel backing plates as shown at 74 and 76 in FIG. 2. The two header plates 54, 56 are essentially identical.

Ion exchange resins normally employed in most industrial and commercial systems have a particle size nominally in the 16-40 U.S. mesh range with an effective size of typically 0.5 mm. The resins employed in bed 46 are finer than 40 mesh and preferably in the 80-120 mesh range with an effective size of typically 0.12 mm which is approximately 25% of that normally employed. Aside from their superior ion exchange kinetics, these finer resins have a number of advantages compared with coarser resins:

1. They are much stronger mechanically.
2. They are much less prone to attrition due to swelling and shrinking.
3. A bed of fine resin particles has a much lower permeability. In the laminar flow regions normally encountered in ion exchange, pressure drop varies approximately as an inverse function of the square of the particle diameter. It can therefore be expected that a 3" bed of this resin will have a pressure drop approximately equal to a 48 inch bed of conventional size resin and consequently provide similar flow distribution characteristics.
4. A slurry of such fine resin can be maintained in suspension very easily and as a result can be pumped with great ease, the significance of which will become apparent below.

Sufficient resin is used so that the resin is "overpacked" (as defined above) and no freeboard space exists above the resin bed 46. As a result no gross movement of the resin is possible. The depth of the resin bed 46 and the pressure drop is therefore uniform across the entire bed area, providing the resin is packed evenly. Confining the resin in this manner has the added advantage of allowing flow in an upward direction without disturbing the resin bed 46. A confined resin bed also provides an effective reinforcement for the screens 66, 68 as the liquid enters the bed and tries to push the screen away from the header plate 54 or 56 and pull it out from between the sealing surface of the header plate and the shell flange 60, 62. A consequence of confining the resin with no freeboard in this manner is that it is not possible to fluidize the resin bed during backwash as with a conventional column.

Overpacking also causes a small amount of resin deformation, which compensates for any resin shrinkage that may occur during operation. As a result, packing irregularities caused by resin shrinkage are eliminated. Packing the column in this manner ensures that the entire column is full of resin and evenly packed at all times.

It has also been found that overpacking not only allows uniform flow distribution in a vertical direction through short beds of particulate media but, in addition, allows the column to be oriented with its center line horizontal so that flow would then be passed through the column in a horizontal direction. This is not feasible in a conventional column and is in direct contrast to the teachings of the prior art, since the resin would settle to the bottom of the column and the liquid would then pass over the top of the resin bed instead of evenly through it. For example, the Hunter U.S. Pat. No. 3,385,788 is based on the teaching that the column is vertical and that liquids used in the process should be passed through the column so that, whenever two liquids are in contact, the more dense liquid is below the less dense.

Conventional ion exchange columns are operated to maximize operating ion exchange capacity. Usually they are operated to a capacity in excess of 75% of the utlimate capacity. Ion exchange capacity is expressed as gram equivalents per liter of resin.

In the present invention on the other hand, less than 75% and usually less than about 35% of the total ion exchange capacity is preferably utilized. For example, if the volume change of an ion exchange resin when totally converted from one ionic form to another is 15%, if 12.5% of the capacity is employed, the volume change would be only 1.9%. This is well within the allowable deformation of most ion exchange resins. In addition, as discussed above, the fine resins employed as much stronger than conventional coarse resins. Reduction in shrinkage also reduces packing irregularity and flow maldistribution.

Overpacking of the resin in the vessel can be achieved by a number of different methods, three examples of which are given below and are described with reference to FIGS. 4, 5 and 6.

Method 1

Figure 4:
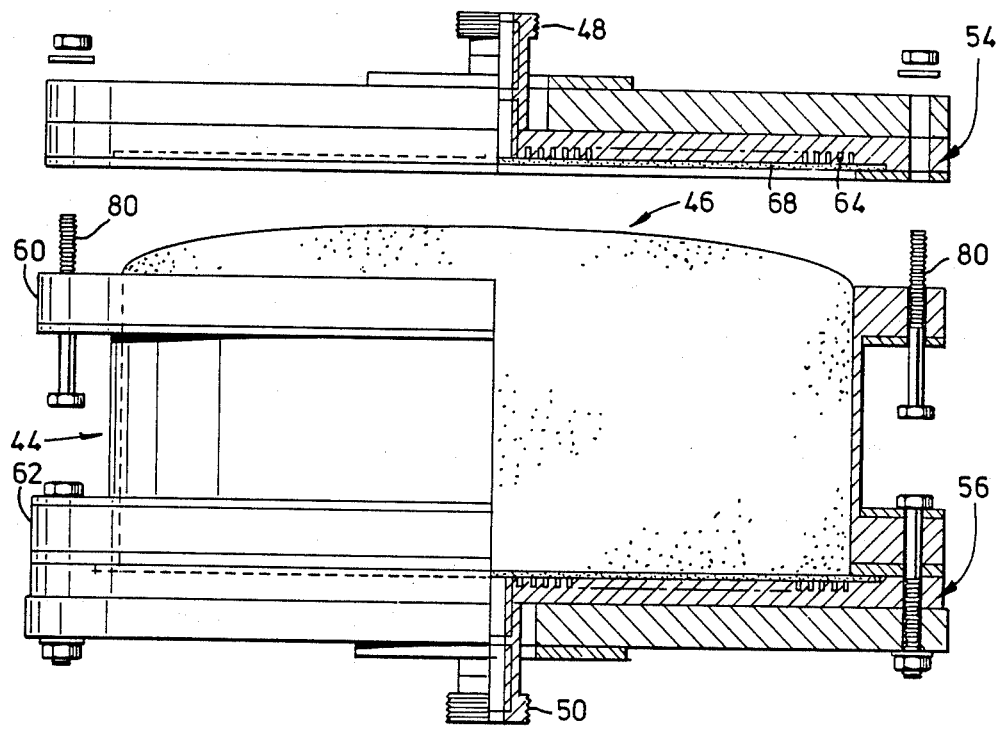
FIG. 4 is a view similar to FIG. 2 but partly exploded to illustrate one method of achieving the required overpacking of the resin bed in the apparatus.

Referring first to FIG. 4, the apparatus is partially assembled with the shell (58,60, 62), lower header plate 46, reinforcement plate 74, screen 66 and gaskets 70 fastened together. Ion exchange resin is poured or scooped into the open top of the column and mounded over the edge of the top flange surface 54 of the shell as shown in FIG. 4. Any free water in the column is drained through the bottom port 50. The top screen 68, header plate 54 and reinforcement plate 76 are then laid on top of the resin mound. Bolts 80 are then installed and tightened. This compresses the mound of resin until the components come together on the shell flange surface and seal leaving the resin packed under compression in the column.

Method 2

Figure 5:
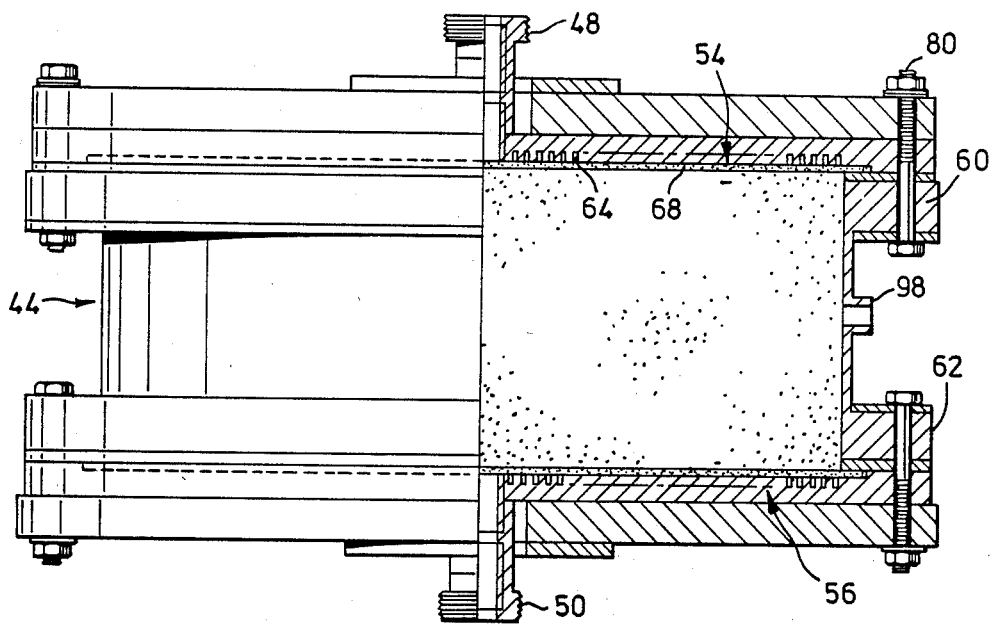
FIGS. 5 and 6 are views similar to FIG. 2 but showing an alternative method of achieving the required overpacking.
Figure 6:
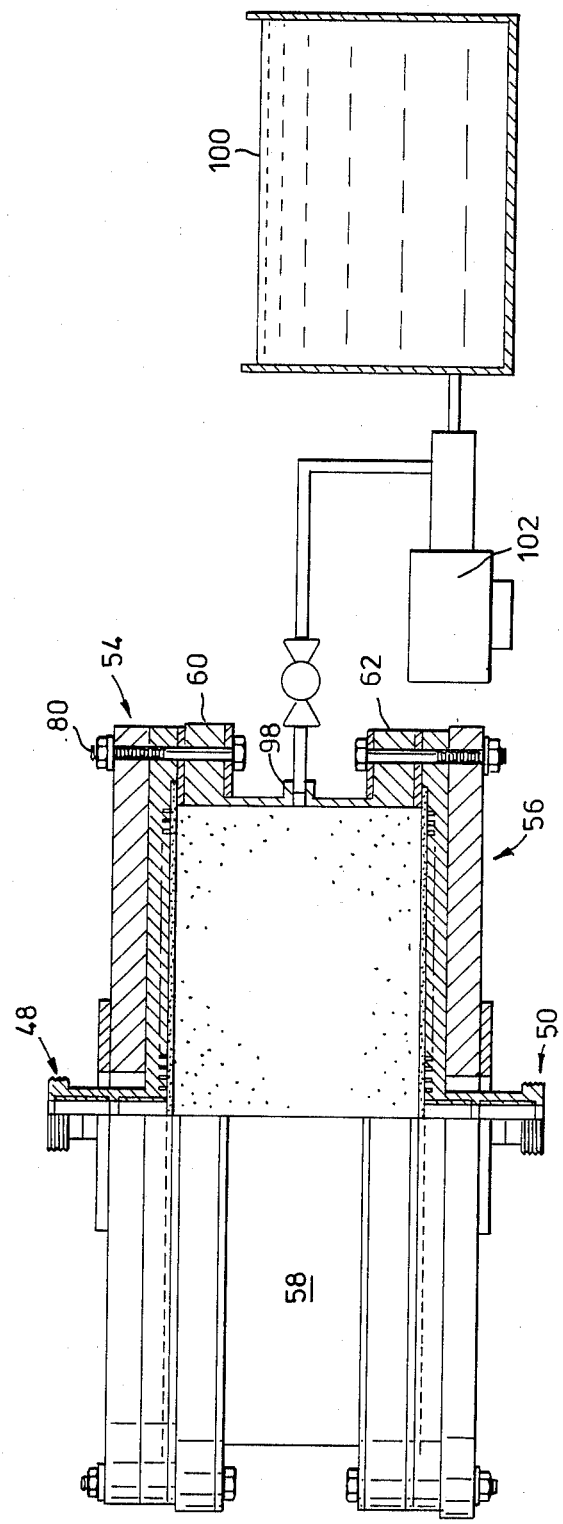

The column is equipped with a port 98 located on the side of the shell to permit resin additions as shown in FIG. 5. In this case the column is completely assembled without the resin. The resin is then pumped in as a slurry of water from a supply 100 through this side port 98 using a suitable pump such as progressive cavity pump 102 as shown in FIG. 6. As the slurry is pumped into the column the resin accumulates in the column and the water passes through the screens 66, 68 and out of the top and bottom ports 48, 50. Pumping of the resin slurry is continued until a predetermined degree of resin compression is achieved; in this case this is determined by measuring the back pressure at the pump discharge. When this pressure reaches a high value, for example greater than about 100 psi, a valve 104 located immediately adjacent to the shell side port 98 is closed and then the pump can be turned off. The column is now packed tightly with resin. Resin compression could of course be measured in other ways.

Filling of the column in this manner is somewhat facilitaed by tipping the column on its side so that the resin port 98 is facing in an upward direction while being filled.

Method 3

Methods 1 and 2 can be modified slightly to avoid the necessity of mounding the resin above the shell flange surface according to Method 1 and to reduce the pumping pressure required according to Method 2.

In this case the resin is shrunken down before putting it into the column. This can be done by changing its ionic form to a less swollen form that the form in which it will be employed. With strong base anion resin, for example, the resin would be put in the chloride form which is less swollen than the hydroxyl form. Some resins may also be shrunk without changing ionic form. For example, it may also be possible to place the resin in a solvent which will shrink the resin. For example, strong acid cation resin can be placed in a concentrated acid solution prior to adding the resin to the column either by Method 1 or 2. Alternatively, acid can be pumped into the column through the header ports after some resin has already been added to the column thereby shrinking the resin and making room for the addition of more resin. When the column is placed in service the resin will swell somewhat, packing it tightly in the column.

Figure 10:
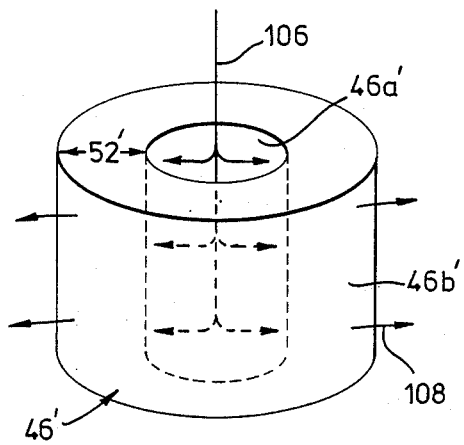

FIG. 10 is a schemmatic illustration showing an alternative resin bed configuration. For simplicity of illustration, the structure of the apparatus itself has not been shown. The resin bed itself is denoted by reference numeral 46' and is arranged in an annular configuration. The bed has cylindrical end faces denoted 46a' and 46b' through which liquid can enter and leave the resin bed. The depth of the bed is denoted 52' and is uniform throughout but the cross-sectional area of the bed will of course increase uniformly from the inner end face 46a' to the outer face 46b'. The apparatus will be designed to permit introduction of liquid to be treated into the resin bed through end face 46a' as indicated by arrow 106 in FIG. 10 and for the treated liquid to leave the bed through face 46b' as indicated at 108, and vice versa.

Obviously, the the design of the header plates, screens and supporting structure will have to be adapted to the annular resin bed configuration. Overpacking of the resin bed probably will not be possible by Method 1 desribed above but Methods 2 and 3 can be employed.

EXAMPLES

It is possible to evaluate flow distribution in an ion exchange column by measuring the purity of the liquid leaving the column. If the flow distribution is poor, some of the liquid processed will short circuit a portion of the resin and as a result be purified to a reduced degree.

Another method to evaluate flow distribution is the liquid displacement method wherey one liquid is displaced from the column with another. The shape of the concentration profile of the effluent leaving the column is an indicator of the flow distribution through the column.

EXAMPLE ONE

An ion exchange column of the design shown in FIG. 2 with an internal diameter of 36" and a nominal bed height, equal to the length of the shell, of 3" was filled according to Methods 2 and 3 with a strong acid sulfonic acid ion exchange resin with a nominal size distribution of 80-120 US mesh. The flow distribution was evaluated according to the liquid displacement method according to the following procedure.

1. Water was pumped through the column to ensure that the entire void space in the column was devoid of air.
2. Approximately 50 liters of sulfuric acid at a concentration of approximately 50 g/L was pumped into the bottom port 50 at a flow rate of approximately 80 liters per minute.
3. Approximately 100 liters of water were pumped into the bottom port 50 at a flow rate of approximately 80 liters per minute.
4. Steps 2 and 3 were repeated several times and resin filling Method 2 was repeated to ensure that the resin was packed tightly in the column.
5. Following several further cycles of steps 2 and 3, the effluent from the top port was collected in aliquots of approximately 5 liters.
6. The aliquots of liquid effluent from the column collected in step 5 were analyzed and the concentration of sulfuric acid was expressed as a fraction of the original concentration.
7. The results in step 6 are graphed as a function of the volume of solution collected expressed in bed volumes as shown in FIG. 7.

Figure 7:
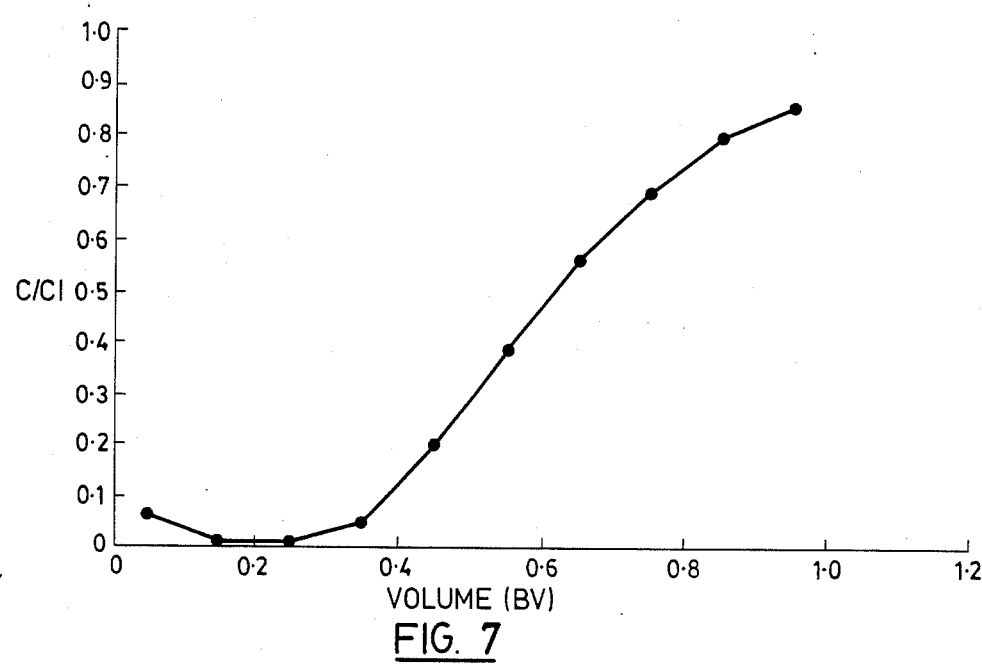
FIGS. 7, 8 and 9 are graphs illustrating specific examples of results achieved using the process of the invention; and, FIG. 10 is a schemmatic illustration showing an alternative resin bed configuration.

It can be noted from FIG. 7 that the concentration rises very sharply, increasing from 10% of initial to 90% of initial concentration within 0.6 bed volumes. This is an indication of excellent flow distribution.

EXAMPLE TWO

The column described in Example One was evaluated for flow distribution as described in Example One except that the column was turned on its side so that the flow was passed horizontally through the column instead of vertically upward.

Figure 8:
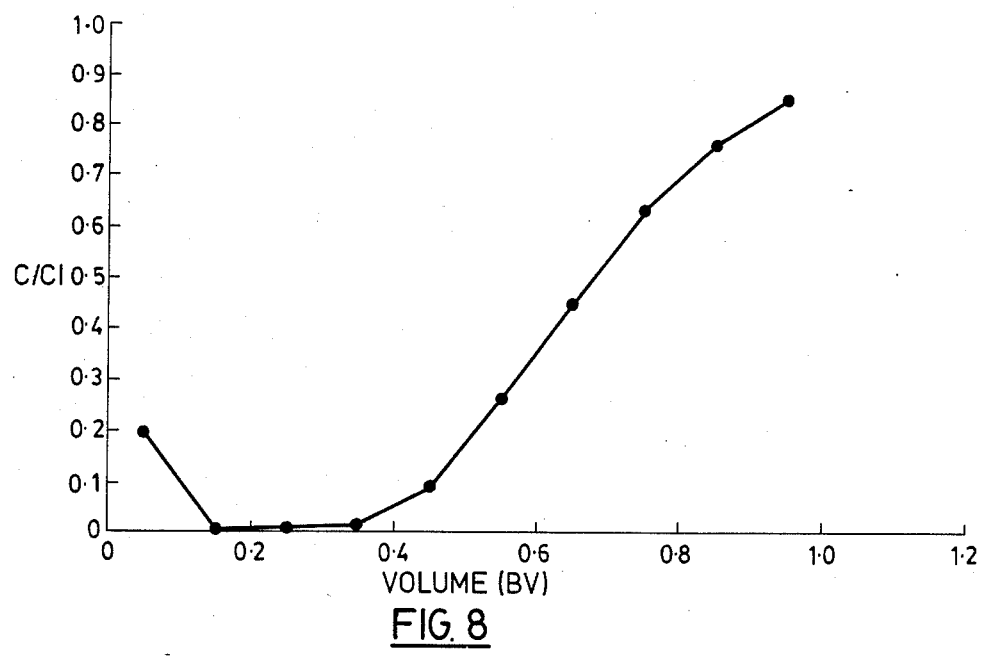

The displacement profile produced is shown in FIG. 8. It can be noted from FIG. 8 that the concentration rises very sharply, increasing from 10% of initial to 90% of initial concentration within 0.55 bed volumes. This is an indication of excellent flow distribution.

It can be noted that the shape of the displacement profile in FIG. 8 is very similar to the profile in FIG. 7 where the flow direction was vertically upward, indicating that the flow distribution is very similar, regardless of the direction of flow.

After completion of the experiment the top header plate 54, backing plate 76 and screen 68 were removed from the column and the resin bed was inspected. It was found that the resin completely filled the cavity in the column and the top level of the resin was approximately 0.5 inches above the shell flange surface. This indicated that the resin bed must have been under compression and then swelled when the column was disassembled.

EXAMPLE THREE

A water deionization system consisting of one column 16 inches inside diameter by 6" nominal bed height containing 80-120 US mesh strong acid cation exchange resin and a second column measuring 16" inside diameter by 4" nominal bed height containing 80-120 US mesh strong base anion exchange resin was assembled. The columns were filled with resin according to Filling Method 1. The cation and anion columns were connected in such a way so that they could be regnerated countercurrently with hydrochloric acid and sodium hydroxide respectively and subsequently rinsed with deionized water.

Figure 9:
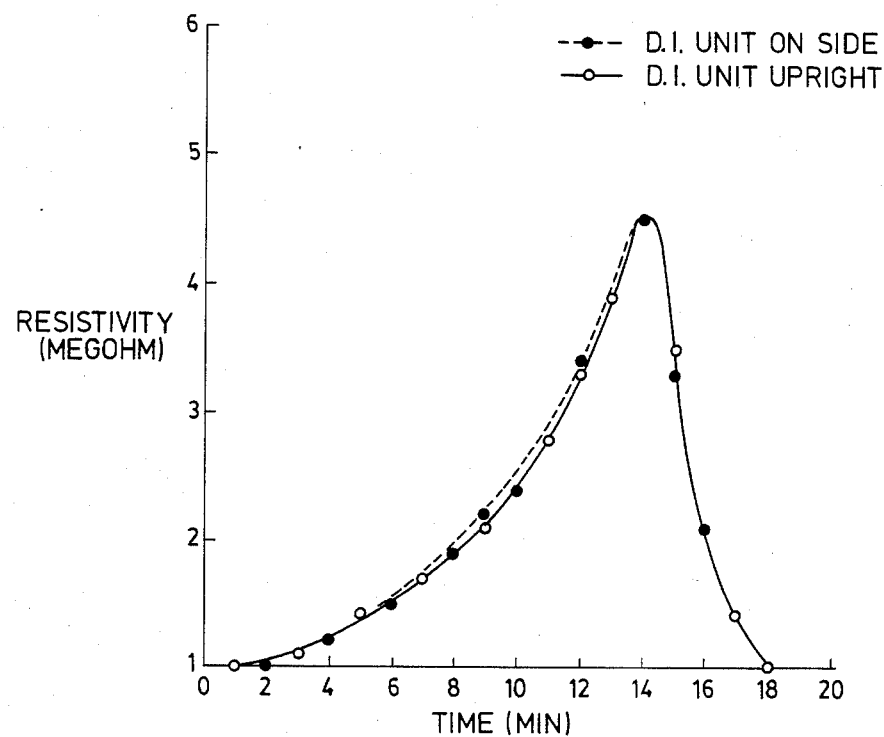

Tap water containing approximately 170 mg/l of total dissolved solids (as $CaCO_3$) was pumped through the cation resin column and then through the anion column at a flow rate of approximately 80 liters per minutes to remove dissolved contaminants. The system was operated for several service/regeneration cycles and then a small amount of additional resin was added to each column according to the same method to ensure that the columns were well packed. The resin bed is oriented so that the flow was passed in a horizontal direction through the cation column and then the anion column. The resistivity of the deionized water produced during one service cycle was measured as the cycle proceeded and the results are shown in FIG. 9. It can be noted that the resistivity of the water produced varied from approximately 1 megohm-cm to a maximum of approximately 4.5 megohms-cm over a service cycle of approximately 18 minutes. During this period approximately 12.5% of the total exchange capacity of the cation resin bed was utilized and approximately 27% of total exchange capacity of the anion resin bed was utilized.

The high resistivity of the water produced is an indication that excellent flow distribution was achieved through the resin beds during both service and regeneration.

EXAMPLE FOUR

The columns in Example Three were reoriented so that the flow was passed through the columns in a vertical downward direction during the deionization cycle. The resistivity of the deionized water produced during one cycle was measured as the cycle proceeded and the results are shown in FIG. 9. It can be noted that the resistivity of the water produced varied from approximately 1 megohm-cm to a maximum of approximately 4.5 megohm-cm over a service cycle of approximately 18 minutes. The high resistivity of the water produced is an indication that the excellent flow distribution was achieved through the resin beds. It can also be noted that these results are very similar to those obtained in Example Three indicating that the flow distribution is essentially the same in the vertical flow direction as in the horizontal flow direction.

In concluding, it should be noted that the preceding description relates to particular preferred embodiments of the invention only and that many modifications are possible within the broad scope of the invention.

I claim:

1. Apparatus for treating a fluid to remove a component therefrom, by a process in which the fluid is passed through a bed of particulate material capable of taking up the component from the fluid, wherein the apparatus comprises:
  a vessel containing a said bed of particulate material, said material being an ion exchange resin that is both capable of taking up said component from the fluid and capable of being regenerated in place, and the volume of which changes appreciably in use, the vessel having first and second ports for permitting flow of fluid through the bed from said first port to said second port and reverse flow for regeneration of said resin.
  means confining the bed within the vessel so that the bed defines first and second end faces, a substantially constant bed depth between said faces of less than about 30 inches, and a cross-sectional area which is constant or increases uniformly from one face to the other, said confining means including headers at the respective bed end faces, each including fluid flow passageways providing communication between the bed and the relevant one of said ports, the passageways being arranged to distribute fluid flowing from a said port into the bed substantially evenly over the cross-sectional area of the bed at said face;
  said resin being fully confined by said confining means in an overpacked condition, the particle size and the degree of overpacking of said resin being selected to provide for substantially even distribution of fluid across the cross-sectional area of the bed in flowing between said bed end faces.

2. An apparatus as claimed in claim 1, wherein the particle size of the particulate material is finer than 40 U.S. mesh.

3. An apparatus as claimed in claim 2, wherein the particle size of said resin is in the range 80–120 U.S. mesh.

4. An apparatus as claimed in claim 1, wherein each said header includes a header plate formed with said fluid flow passageways, the passageways extending outwardly from a central location communicating with the relevant said port, the passageways comprising channels opening into an inner face of said plate, and a screen covering said channels and having openings smaller than the size of particles in said bed, whereby the screen prevents the resin particles entering the said passageways and the overpacked resin holds the screen against the associated header plate.

5. An apparatus as claimed in claim 4, wherein each said port comprises a tubular member extending outwardly from the relevant header plate and communicating with an opening generally centrally of said plate, the plate being provided with a baffle for preventing direct impingement on the bed of liquid flowing into the bed from said port, each said header plate being removably clamped to the vessel by a backing plate disposed outwardly of the header plate and removably secured to the vessel, the backing plate having a central opening through which said tubular member extends and the backing plate removably trapping the header plate against the vessel whereby the header plate can be removed for providing access to the bed of particulate material by removing the back plate.

6. An apparatus as claimed in claim 5, wherein the vessel comprises a open ended cylindrical member having respective flanges surrounding said open ends, and wherein the backing plates of the respective headers are removably secured to the respective flanges, trapping the associated header plates between the backing plates and said flanges.

7. An apparatus as claimed in claim 1, wherein said vessel is provided with an additional port communicating with said bed for permitting particulate resin material to be introduced into the vessel through the port for forming the bed.

8. An apparatus as claimed in claim 1, wherein the liquid hold-up volume in the flow passageways in each of the headers is less than 0.44 cubic feet per square foot of bed cross-sectional area.

9. An apparatus as claimed in claim 8, wherein said liquid hold-up volume is less than 0.03 cubic feet per square foot of bed cross-sectional area.

10. A process for treating a fluid to remove a component therefrom, in which the fluid is passed through a bed of a particulate material in the form of an ion exchange resin that is capable of both taking up the component from the fluid and of being regenerated in place and the volumne of which changes appreciably in use, wherein the bed comprises particles of substantially uniform size maintained in an overpacked condition between first and second end faces of the bed, the bed defining a substantially constant depth between said faces of less than about 30 inches and a cross-sectional area which is constant or increases uniformly from one face to the other, and wherein the fluid is passed through the bed by distributing the fluid substantially uniformly across one of said end faces, permitting the fluid to flow through the bed and collecting the fluid substantially uniformly across the other said end face, the size of the particles in the bed and the degree of overpacking being selected to provide for substantially even distribution of fluid across the cross-sectional area of the bed in flowing between said bed end faces, and the process being operated at a capacity of less than about 35% of the maximum capacity of the process.

11. A process as claimed in claim 10, wherein the particle size of the particulate material is finer than 40 U.S. mesh.

12. A process as claimed in claim 11, wherein the particle size of said material is in the range 80–120 U.S.

13. A process as claimed in claim 11, wherein said bed is of annular shape and said first and second end faces are defined by cylindrical faces at the inside and outside of the annulus, and wherein the fluid is passed through the bed by distributing the fluid across one of said cylindrical faces and collecting the fluid across the the other said cylindrical face.

14. A process as claimed in claim 10, which is operated at a approximately 12.5% of the maximum capacity of the process.

15. A process as claimed in claim 10, which is performed in a vessel having at least one removable header, confining the bed at one end face thereof, wherein the bed is formed by removing the header, overfilling the vessel with resin particles, and fitting the header to the vessel so as to compress the particles.

16. A process as claimed in claim 15, wherein the resin is caused to shrink prior to being introduced into the vessel.

17. A process as claimed in claim 10, which is performed in a vessel containing said bed of particulate material and having a port for introducing said material into the vessel, wherein the bed is formed by pumping the particulate material into the vessel through said port as a slurry in water, permitting the water in the slurry to escape from the vessel and continuing pumping until a predetermined degree of resin compression is achieved, indicating that the resin is overpacked in the vessel.

18. A process as claimed in claim 17, wherein the resin is caused to shrink prior to being introduced into the vessel.

* * * * *

(12) REEXAMINATION CERTIFICATE (4455th)
United States Patent
Brown

(10) Number: US 4,673,507 C1
(45) Certificate Issued: Oct. 16, 2001

(54) FLUID TREATMENT PROCESS AND APPARATUS

(75) Inventor: Craig J. Brown, Pickering (CA)

(73) Assignee: Eco-Tec Limited, Pickering (CA)

Reexamination Request:
No. 90/005,899, Dec. 22, 2000

Reexamination Certificate for:
Patent No.: 4,673,507
Issued: Jun. 16, 1987
Appl. No.: 06/737,123
Filed: May 23, 1985

(51) Int. Cl.[7] .................................................. C02F 1/42
(52) U.S. Cl. ................................................ 210/681; 210/289
(58) Field of Search ............................... 210/681, 289

(56) References Cited

U.S. PATENT DOCUMENTS

| | | | |
|---|---|---|---|
| 3,385,788 | 5/1968 | Hunter | 210/35 |
| 3,458,436 | 7/1969 | Martinola | 210/20 |
| 4,366,060 | 12/1982 | Leiser | 210/635 |

OTHER PUBLICATIONS

Eco–Tec Limited, "Acid Purification Unit" Manual M116, Oct. 1, 1977.

EPO Boards of Appeals Decisions, Case No. T 0489/94–3.4.2, dated Dec. 13, 1995, regarding European Pat. No. 0 201 640, to Eco–Tec Limited.*

* cited by examiner

*Primary Examiner*—Chester T. Barry

(57) ABSTRACT

An apparatus and process for treating a fluid by passing the fluid through a bed of particulate material such as an ion exchange resin capable of taking up from the fluid a component to be removed therefrom. Substantially uniform fluid flow distribution across the cross-sectional area of the bed is achieved by employing resins of fine particle size which are maintained in an overpacked condition.

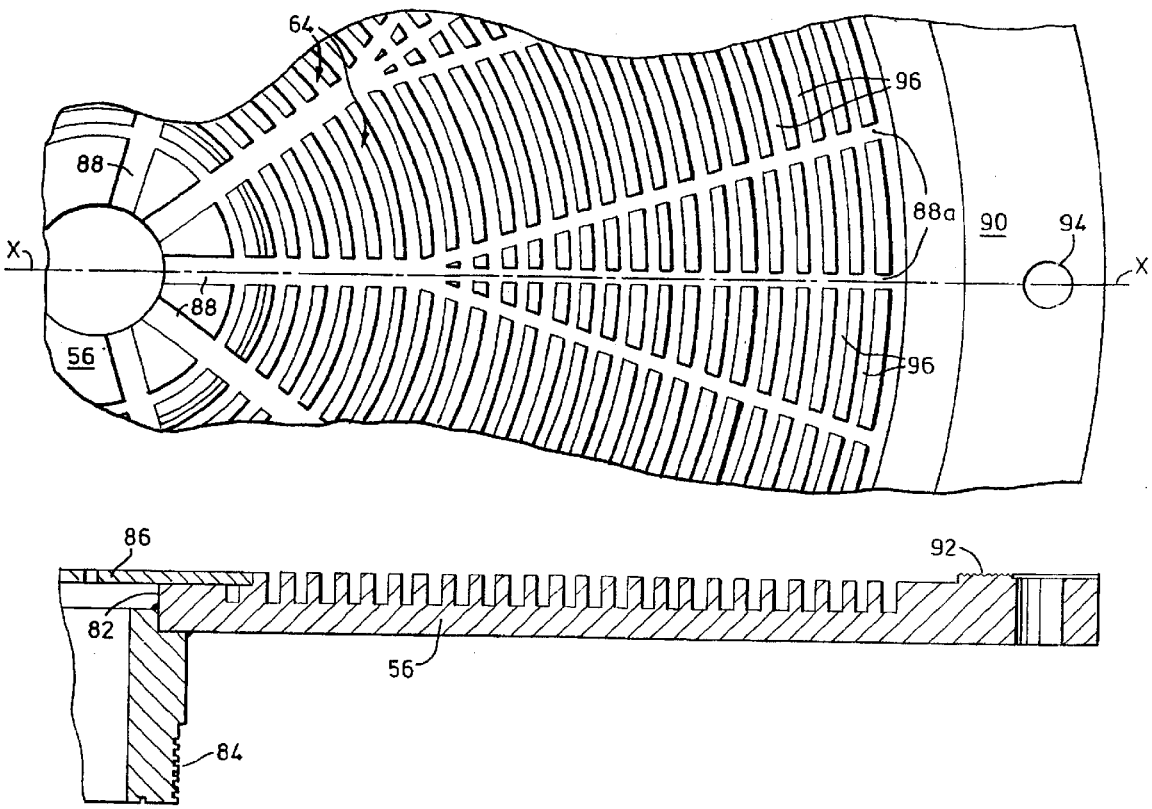

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

\* \* \* \* \*